US011990692B2

(12) United States Patent
Seong et al.

(10) Patent No.: US 11,990,692 B2
(45) Date of Patent: May 21, 2024

(54) ANTENNA MODULE AND VEHICLE COMPRISING SAME

(71) Applicant: KESPION Co., Ltd., Incheon (KR)

(72) Inventors: Won Mo Seong, Gyeonggi-do (KR); Ui Sheon Kim, Gyeonggi-do (KR); Se Ah Choi, Seoul (KR); Gi Ho Kim, Gyeonggi-do (KR); Hyun Seob Jeong, Seoul (KR)

(73) Assignee: KESPION CO., LTD., Incheon (KR)

( * ) Notice: Subject to any disclaimer, the term of this patent is extended or adjusted under 35 U.S.C. 154(b) by 303 days.

(21) Appl. No.: 17/612,045

(22) PCT Filed: May 14, 2020

(86) PCT No.: PCT/KR2020/006368
§ 371 (c)(1),
(2) Date: Nov. 17, 2021

(87) PCT Pub. No.: WO2020/235866
PCT Pub. Date: Nov. 26, 2020

(65) Prior Publication Data

US 2022/0239005 A1 Jul. 28, 2022

(30) Foreign Application Priority Data

May 17, 2019 (KR) ........................ 10-2019-0057925

(51) Int. Cl.
*H01Q 9/40* (2006.01)
*H01Q 1/32* (2006.01)

(52) U.S. Cl.
CPC ................. *H01Q 9/40* (2013.01); *H01Q 1/32* (2013.01)

(58) Field of Classification Search
None
See application file for complete search history.

(56) References Cited

U.S. PATENT DOCUMENTS 8,654,030 B1 2/2014 Mercer
10,326,495 B1 * 6/2019 Barzegar .................. H04B 3/54
2005/0128151 A1 * 6/2005 Kwak ...................... H01Q 9/42 343/702

(Continued)

FOREIGN PATENT DOCUMENTS

JP 2008-199688 A 8/2008
JP 2016-046739 A 4/2016

(Continued)

OTHER PUBLICATIONS

International Search Report for PCT/KR2020/006368 mailed on Oct. 14, 2020.

*Primary Examiner* — Wilson Lee
(74) *Attorney, Agent, or Firm* — The PL Law Group, PLLC

(57) ABSTRACT

An antenna module according to an embodiment of the present disclosure includes a main board, a ground area formed in a rectangular shape on at least a portion of a main board, a pair of power feeding units formed at edge portions of the ground area while being spaced apart from each other, and a pair of monopole antennas electrically connected to the power feeding units, respectively, and disposed on the ground area while protruding from the ground area. The monopole antennas may be configured to be asymmetric about the feeding unit.

10 Claims, 6 Drawing Sheets

(56) References Cited

U.S. PATENT DOCUMENTS

| | | | | |
|---|---|---|---|---|
| 2010/0097286 | A1* | 4/2010 | Morrow | H01Q 1/42 343/810 |
| 2011/0018780 | A1* | 1/2011 | Tassoudji | H01Q 21/28 343/893 |
| 2015/0054706 | A1* | 2/2015 | Shimura | H01Q 9/42 343/843 |
| 2015/0311582 | A1* | 10/2015 | Hu | H01Q 21/28 343/727 |
| 2016/0233590 | A1* | 8/2016 | Ng | H01Q 21/205 |
| 2017/0317413 | A1* | 11/2017 | Mei | H01Q 1/52 |
| 2018/0342789 | A1* | 11/2018 | Jiang | H01Q 1/528 |
| 2019/0020114 | A1* | 1/2019 | Paulotto | H01Q 9/40 |
| 2019/0020713 | A1* | 1/2019 | Hulick | H01Q 9/42 |
| 2019/0221925 | A1* | 7/2019 | Mata Garcia | H01Q 21/28 |
| 2020/0044329 | A1* | 2/2020 | Wu | H01Q 1/36 |

FOREIGN PATENT DOCUMENTS

| | | | |
|---|---|---|---|
| KR | 10-2010-0122803 | A | 11/2010 |
| KR | 10-2015-0108689 | A | 9/2015 |

* cited by examiner

ANTENNA MODULE AND VEHICLE COMPRISING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2020/006368, filed May 14, 2020, which claims priority to the benefit of Korean Patent Application No. 10-2019-0057925 filed in the Korean Intellectual Property Office on May 17, 2019, the entire contents of which are incorporated herein by reference.

BACKGROUND

1. Technical Field

The present invention relates to an antenna module and a vehicle comprising the same and, more particularly, to an antenna module provided in a vehicle and transmitting/receiving a communication signal to provide a communication service, and a vehicle comprising the same.

2. Background Art

Efforts to improve data transmission speed have continued as the amount of data usage through communication networks has rapidly increased. For example, with the development of the long term evolution (LTE) communication standard, the frequency band has been expanded to improve the data transmission speed. Recently, the 5G communication standard has been developed to further expand the data transmission speed and processing capacity, but the communication system for implementing the communication standard is still insufficient.

Recently, a new concept of vehicle wireless Internet service that combines wireless communication and vehicles according to such an LTE or 5G communication standard has been developed. There is suggested a 'telematics' technology that provides user-centered services such as telex, videotex, and facsimile, by exchanging information using a communication system inside and outside a vehicle or between vehicles based on the wireless voice and data communication and the location information system using satellites.

In order to implement such telematics, the antenna module provided in a vehicle needs to support not only the LTE communication standard, but also the 5G communication standard. To support such communication standard, it is necessary to develop a technology for expanding the frequency band of the antenna module.

SUMMARY

Accordingly, the technical task of the present invention has been conceived in this regard, and the present invention can implement stable telematics by providing an antenna module which can be equipped with the 5G communication standard as well as the LTE communication standard through frequency band expansion.

According to an embodiment of the present invention, there is provided an antenna module that includes a main board; a ground area formed in a rectangular shape on at least a portion of a main board; a pair of power feeding units formed at edge portions of the ground area while being spaced apart from each other; and a pair of monopole antennas electrically connected to the power feeding units, respectively, and disposed on the ground area while protruding from the ground area, wherein the monopole antennas are configured to be asymmetric about the feeding unit.

The power feeding units may be formed at both ends of one short side of the rectangular ground area while facing each other.

One of the pair of monopole antennas may be disposed along a long side of the ground area, and a remaining monopole antenna may be disposed along a short side of the ground area.

The antenna module may further include a global navigation satellite system (GNSS) antenna or a Wi-Fi antenna disposed along a long side of the ground area in adjacent to the monopole antenna disposed along the long side of the ground area.

The monopole antennas may include multi input and multi output (MIMO) antennas.

The monopole antennas may be formed in an inverted triangular shape and bent outward at a predetermined height.

The antenna module may further include a carrier formed of an insulating material which is provided on the ground area to support a plurality of monopole antennas.

The antenna module may further include a non-ground area formed adjacent to the ground area on the main board, and the non-ground area is configured to overlap at least a portion of a bent portion of the monopole antenna which is formed by bending the monopole antenna.

A horizontal length of the bent monopole antenna may be longer than a vertical length of the bent monopole antenna.

According to another embodiment of the present invention, there is provided a vehicle including the antenna module.

According to an embodiment of the present invention, it is possible to implement stable telematics by providing an antenna module capable of supporting 5G communication standards as well as LTE communication standards through frequency band extension.

Effects of the present invention may not be limited to the above, and other effects will be clearly understandable to those having ordinary skill in the art from the appended claims.

BRIEF DESCRIPTION OF THE DRAWINGS

The summary described above as well as the detailed description of the preferred embodiments of the present application to be described below may be better understood when read in conjunction with the accompanying drawings. For the purpose of illustrating the present invention, preferred embodiments are shown in the drawings. However it should be understood that the present application is not limited to the arrangements and means shown in the drawings.

DETAILED DESCRIPTION

Figure 1:
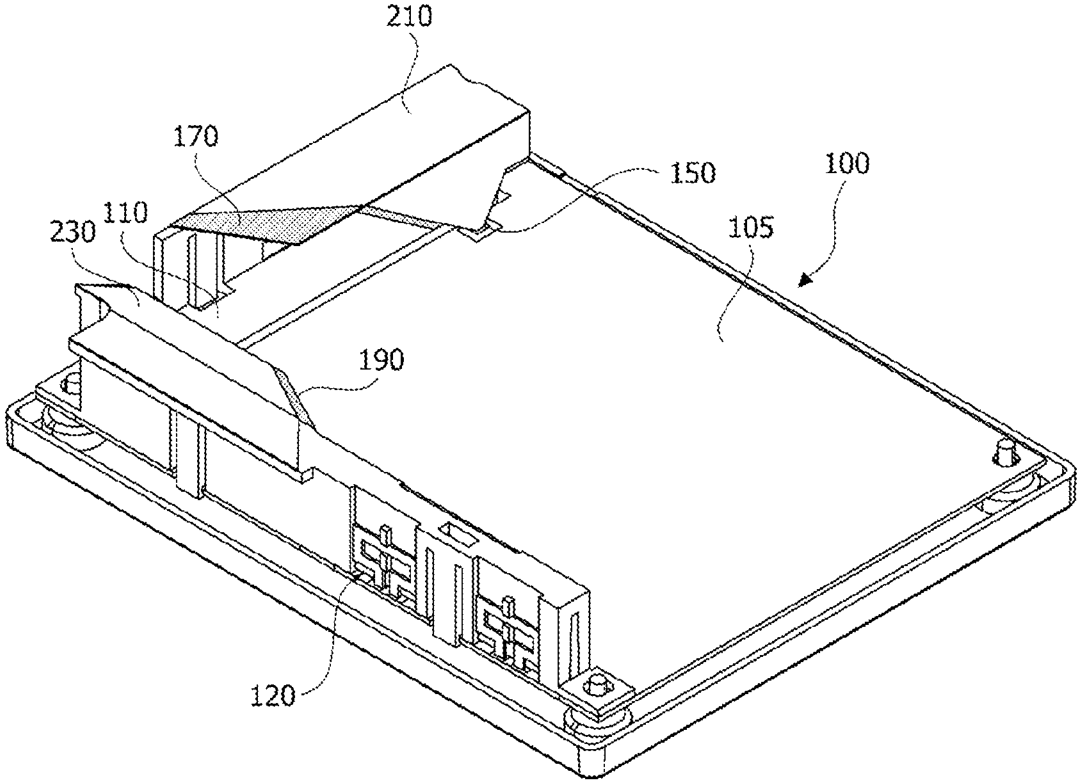
FIG. 1 is a perspective view of an antenna module according to an embodiment of the present invention.

Hereinafter, various embodiments of the present invention will be described in detail with reference to the accompanying drawings. However, the features of the embodiment disclosed in the present specification will be more clearly understood from the accompanying drawings and should not be limited by the accompanying drawings. It will be readily apparent to those skilled in the art that the scope of the present invention is not limited to the scope of the accompanying drawings.

In describing the embodiments of the present invention, the same names and reference numerals are used for the components having the same functions, and it is stated in advance that they are not substantially the same as the components of the related art.

Terms used in this disclosure are used to describe specified examples of the present invention and are not intended to limit the scope of the present invention. The terms of a singular form may include plural forms unless otherwise specified. In the present invention, terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Hereinafter, an antenna module and a vehicle including the same will be described in detail with reference to accompanying drawings. In the following description, the same reference numerals will be assigned to the same or corresponding elements and redundant description thereof will be omitted.

FIG. 1 relates to an antenna module according to an embodiment of the present invention, wherein the antenna module according to the embodiment is installed in a vehicle to wirelessly transmit/receive data. The antenna module may be disposed inside the vehicle or may be in the form of a mobile terminal carried by a driver positioned in the vehicle, and the antenna module may be installed on the vehicle roof of the vehicle.

The antenna module according to an embodiment of the present invention may include a main board 100, a ground area 105, power feeding units 150 and 160, and monopole antennas 210 and 230.

The main board 100 may be mounted inside an antenna device (not shown) including an antenna module. The main board 100 may be a hard type printed circuit board (PCB) or a flexible printed circuit board (FPCB).

In this case, a plurality of electronic components (electronic function group) may be mounted on the main board 100. In detail, a connector for connecting the main board 100 and another external electronic device (not shown), a GNSS antenna for checking location information of a vehicle, a WIFI antenna, and the like may be mounted on the main board 100.

The main board 100 may be configured to include a ground area 105 and non-ground areas 110 and 120. Specifically, the ground area 105 may be formed on a portion of the main board 100, and the non-ground areas 110 and 120 may be formed on the remaining portion of the main board 100 except for the ground area 105.

The ground area 105 may be formed in at least a portion of the main board 100 in a rectangular shape having a long side and a short side. The ground area 105 provides a ground voltage inside the antenna module.

The power feeding units 150 and 160 may be formed to be spaced apart from each other at edge portions of the ground area 105. The power feeding units 150 and 160 feed current to a pair of monopole antennas 210 and 230 to be described later. The feeding units 150 and 160 may be connected to a coaxial cable (not shown) to supply power to the monopole antennas 210 and 230.

The monopole antennas 210 and 230 may be formed as a pair and may be electrically connected to the pair of power feeding units 150 and 160, respectively. The monopole antennas 210 and 230 may be vertically connected to the power feeding units 150 and 160 to protrude from the ground area 105. In detail, the monopole antennas 210 and 230 may protrude to have a predetermined height and a predetermined area, and may be formed in various shapes such as a triangle and a square.

Figure 2:
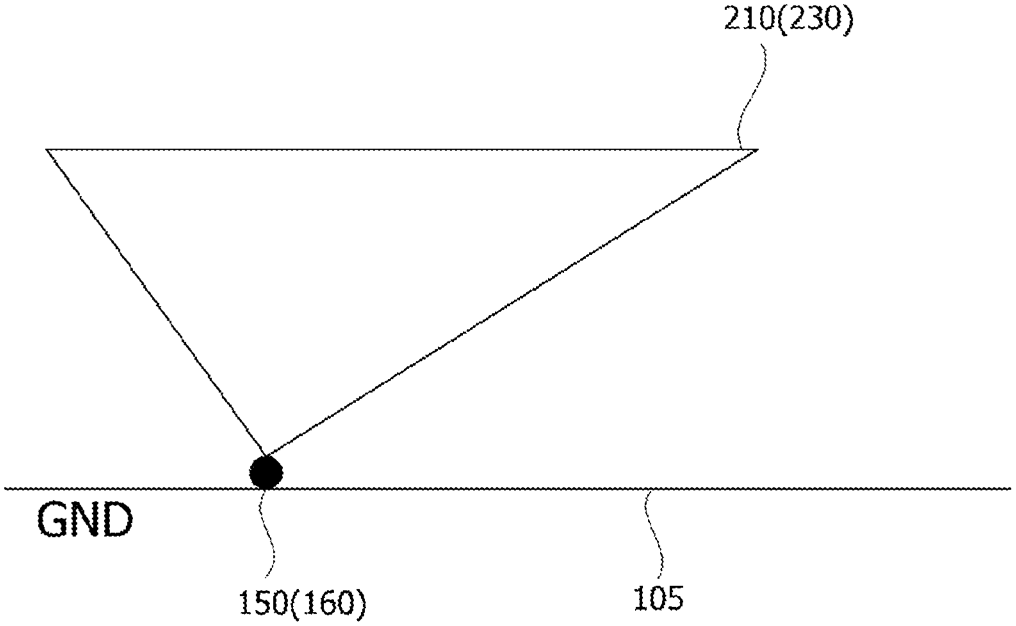
FIG. 2 is a reference diagram for explaining a shape of a monopole antenna according to an embodiment of the present invention.

In this case, the monopole antennas 210 and 230 may be formed to be asymmetrical with respect to the power feeding units 150 and 160. FIG. 2 is a reference view illustrating the shape of the monopole antennas 210 and 230 according to an embodiment of the present invention. Referring to FIG. 2, each of the monopole antennas 210 and 230 having a constant area may be asymmetrically formed such that the areas on the left and right are different with respect to each of the power feeding units 150 and 160. In this case, the sizes of the left and right areas of each of the monopole antennas 210 and 230 may be formed differently depending on the overall size (area and height) of the antenna module and the lowest frequency to be implemented.

For example, when the height of the antenna module is lower than 1/10 of the lowest frequency wavelength and the frequency band to be implemented is the 0.7 GHz band, the ratio between the left and right areas of the monopole antennas 210 and 230 may be set as 2.5:1.

In the present embodiment, it has been described that each of the monopole antennas 210 and 230 is formed in the shape of an inverted triangle and the left and right areas are different based on the vertices of the triangle connected to the power feeding units, but the present invention is not limited thereto. The present invention may include a case where each of the monopole antennas 210 and 230 of various shapes has different areas on the left and right with respect to the power feeding unit 150 or 160.

According to the asymmetric shapes of the monopole antennas 210 and 230, the frequency band of the antenna is expanded, thereby improving antenna performance. In detail, when the monopole antennas 210 and 230 are asymmetrically formed, one side of the antenna is long and another side is short, where the long side of the antenna operates in the low frequency band and the short side operates in the middle and high frequency bands, thereby expanding the frequency band of the antenna. That is, by forming the monopole antennas 210 and 230 asymmetrically, the frequency band may be expanded while maintaining the height in the antenna module having a limited size.

Figure 3:
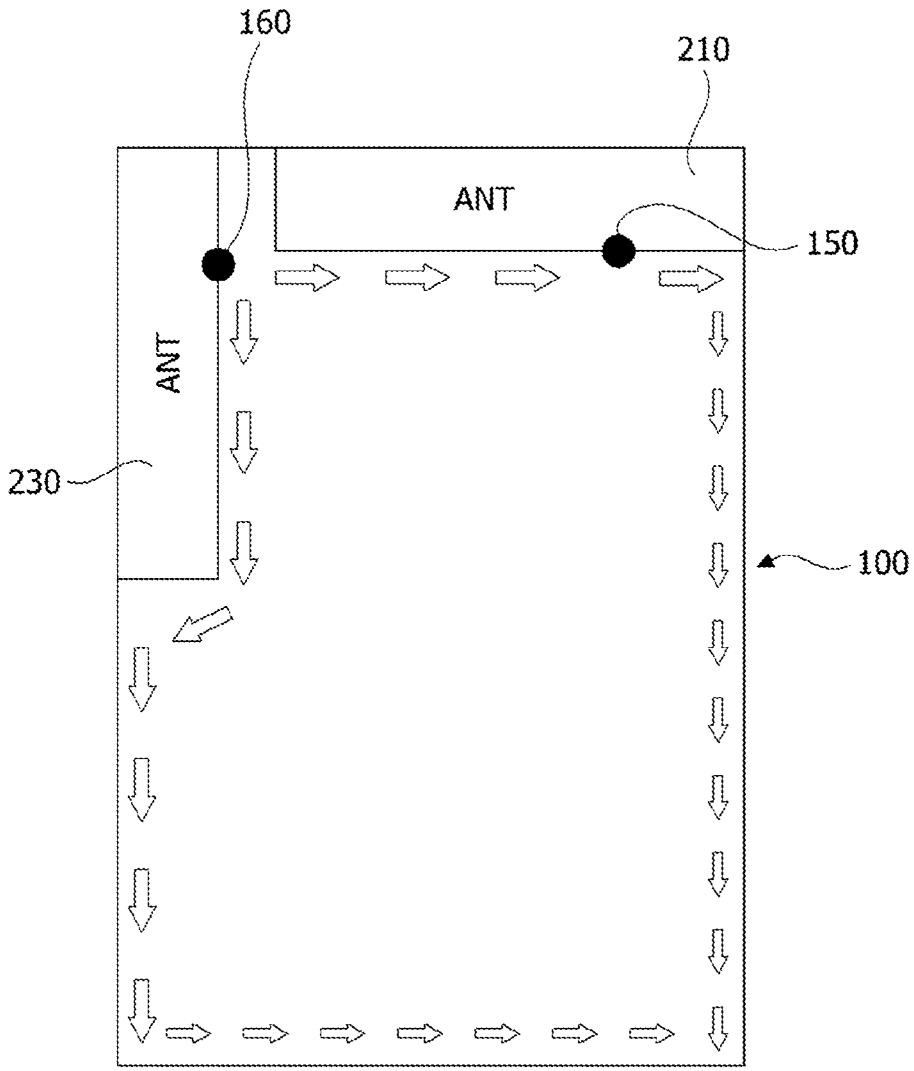
FIGS. 3 and 4 are reference diagrams for explaining an arrangement structure of a monopole antenna of an antenna module according to an embodiment of the present invention.
Figure 4:
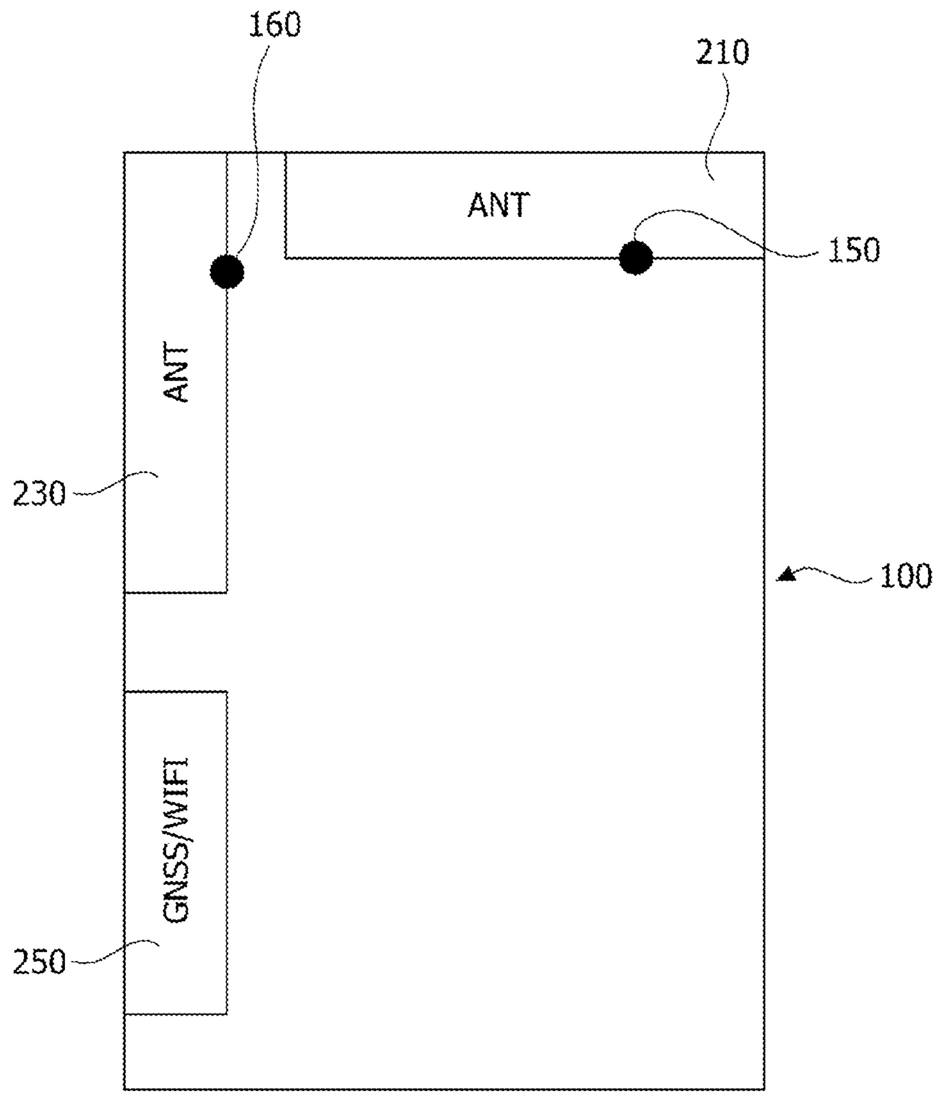

FIGS. 3 and 4 are reference views illustrating the arrangement structure of the monopole antennas 210 and 230 of an antenna module according to an embodiment of the present invention. Referring to FIG. 3, the pair of power feeding units 150 and 160 may be formed to face each other at one edge portion of one short side of the rectangular ground area 105.

In this case, among the pair of monopole antennas 210 and 230, one monopole antenna 230 may be disposed along the long side of the ground area 105, and the other monopole antenna 210 may be disposed along the short side of the ground area 105.

In order to support multiple frequency bands according to the 5G communication standard as well as the LTE communication standard, it is necessary to cover the frequency band while maintaining the degree of isolation above a certain level. In the present embodiment, the power feeding units 150 and 160 may be formed on one edge of one short side (upper side) of the ground area 105, and the monopole antennas 210 and 230 may be disposed along the long and short sides, respectively, thereby achieving such effects. That is, the monopole antennas 210 and 230 may be disposed in perpendicular to each other along the long and short sides of the ground area 105 to vertically form the polarization between the two monopole antennas 210 and 230, so that it is possible to cover the frequency band while maintaining the isolation degree.

For the purpose of high isolation degree, the power feeding units 150 and 160 are preferably spaced apart from each other as far as possible. However, when the feeding line is long, current loss, etc. may occur, thereby degrading the antenna performance. Thus, by arranging the power feeding units 150 and 160 to be spaced apart from each other at one edge of a short side (upper side) of the ground area 105, the isolation degree may be improved while maintaining the antenna performance.

In addition, referring to FIG. 3, a strong current flow may be formed by the pair of monopole antennas 210 and 230 based on the power feeding units 150 and 160 and a current path in the form of a loop is formed as a whole, so that it is possible to expand the frequency band and maintain a high level of isolation.

In this case, the monopole antennas 210 and 230 may be multi-input and multi-output (MIMO) antennas in order to improve the transmission speed.

The antenna module according to an embodiment of the present invention may form a bandwidth of about 600 MHz to 1 GHz in a low frequency band, form a bandwidth of about 1.4 GHz to 2.7 GHz in a middle frequency band, and form a bandwidth of about 3.3 GHz to 6.0 GHz in a high frequency band, thereby improving the bandwidth and increasing the data transmission speed. However, the frequency band of the antenna module may not be limited to the above-mentioned band, and it is also possible to expand the frequency band through tuning.

Meanwhile, referring to FIG. 4, the antenna module according to the present invention may further include a Global Navigation Satellite System (GNSS) antenna 250 or a WIFI antenna 250. The GNSS antenna 250 may transmit/receive data to detect vehicle location information using a satellite navigation system, and the WIFI antenna 250 may support short-range wireless transmission/reception. In this case, the WIFI antenna 250 may be a Multi Input and Multi Output (MIMO) antenna. The GNSS antenna 250 or the WIFI antenna 250 may be disposed along the long side of the ground area 105, and specifically, may be disposed below the monopole antenna 230 when viewed in the drawing such that the GNSS antenna 250 or the WIFI antenna 250 can be adjacent to the monopole antenna 230 disposed along the long side of the ground area. In this case, the GNSS antenna 250 and the WIFI antenna 270 may be modularized so as to be disposed together.

Figure 5:
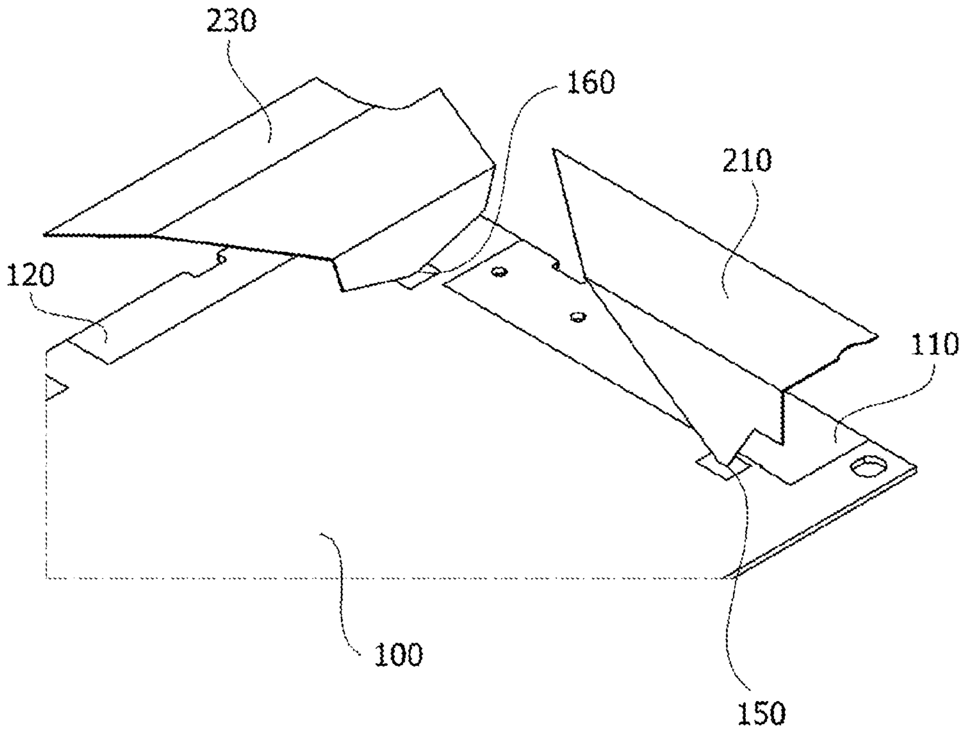
FIG. 5 is a reference diagram for explaining a modified example of an antenna module according to an embodiment of the present invention.

FIG. 5 is a reference diagram for explaining a modified example of an antenna module according to an embodiment of the present invention. Referring to FIG. 5, the monopole antennas 210 and 230 may be configured to have an inverted triangular shape, and may be bent outward at a predetermined height. In general, since the antenna module used for telematics is provided in a limited space of a vehicle, the antenna performance can be maintained in a limited space by bending and disposing the monopole antennas 210 and 230 at a predetermined height. In addition, it is possible to expand the low frequency band by bending the monopole antennas 210 and 230.

In this case, the monopole antennas 210 and 230 may be bent at right angles once, and may be bent twice or more.

In addition, the monopole antennas 210 and 230 may be formed of a flat thin copper plate, and carriers 170 and 190 formed of an insulating material may be provided on the main board 100 to support the monopole antennas 210 and 230. An external impact may be applied due to the driving characteristics of the vehicle. In order to prevent the monopole antennas 210 and 230 formed of the flat panel from being damaged by the external impact, the carriers 170 and 190 formed of an insulating material are provided on the main board 100 and the monopole antennas 210 and 230 are fixed to the carriers 170 and 190, thereby improving the durability of the antenna module.

Figure 6:
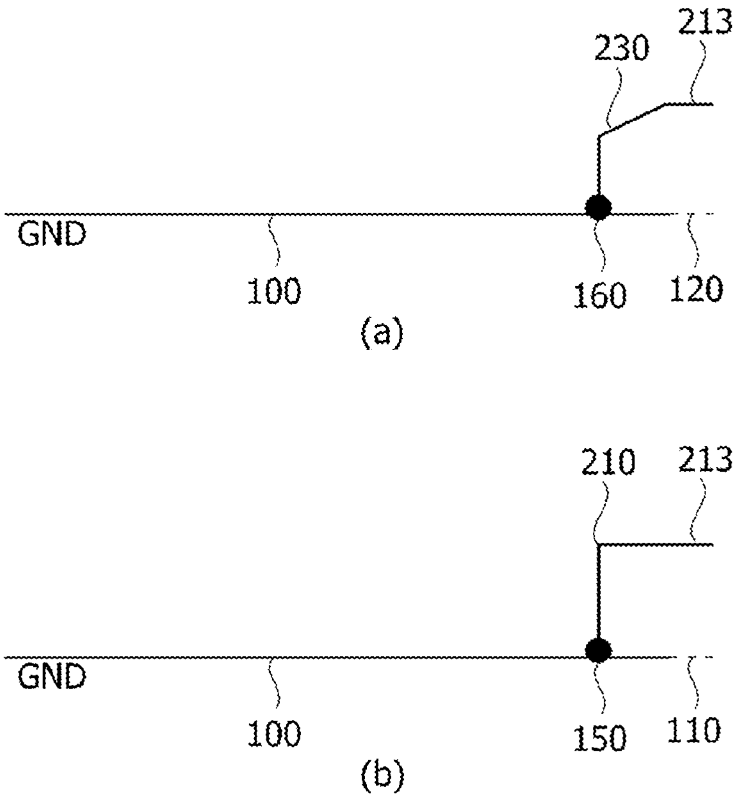
FIG. 6 is a reference diagram for explaining another modified example of an antenna module according to an embodiment of the present invention.

FIG. 6 is a reference diagram for explaining another modified example of an antenna module according to an embodiment of the present invention. Referring to FIG. 6, the antenna module may further include non-ground areas 110 and 120 disposed adjacent to the ground area 105 on the main board 100, and the non-ground areas 110 and 120 may be configured to overlap at least a portion of a bent part 213 of the monopole antennas 210 and 230, which is formed by bending the monopole antennas 210 and 230.

In this case, the non-ground areas 110 and 120 may be formed on a part of the main board 100 in adjacent to the ground areas 110 and 120, and the non-ground areas 110 and 120 may be formed of a dielectric material such as epoxy FR4 or the like.

In addition, the non-ground areas 110 and 120 may be formed by removing a portion of the ground areas 110 and 120 to form a clearance at the boundary of the ground areas 110 and 120.

A part of the monopole antennas 210 and 230 may be located above the non-ground areas 110 and 120, that is, the non-ground areas 110 and 210 may be formed under the monopole antennas 210 and 230, so that the low frequency band performance can be achieved. Accordingly, it is possible to implement a multi-frequency band including a mid-frequency band and a high-frequency band.

Meanwhile, a horizontal length of the bent monopole antennas 210 and 230 may be longer than a vertical length thereof. When the monopole antennas 210 and 230 are bent, they are divided into a vertical direction part and a horizontal direction part. If the length of the horizontal direction part is longer than the length of the vertical direction part, the performance of the monopole antennas 210 and 230 in the horizontal direction can be further improved. In order to implement effective telematics, the horizontal direction performance may be required more than the vertical direction performance of the antenna. In the present embodiment, the monopole antennas 210 and 230 are bent so that the length in the horizontal direction is longer than the length in the vertical direction, thereby improving the performance in the horizontal direction.

Preferred embodiments according to the present invention have been described above, and it is obvious to those skilled in the art that the present invention can be embodied in other specific forms without departing from the spirit or scope of the present invention in addition to the above-described embodiments. Therefore, the above-described embodiments are regarded as illustrative rather than restrictive, and accordingly, the present invention is not limited to the above description, but may be modified within the scope of the appended claims and their equivalents.

What is claimed is:

1. An antenna module comprising:

a main board;

a ground area formed in a rectangular shape on at least a portion of a main board;

a non-ground area formed adjacent to the ground area on the main board;

a pair of power feeding units formed at edge portions of the ground area while being spaced apart from each other; and a pair of monopole antennas electrically connected to the power feeding units, respectively, the pair of monopole antennas protruding from the ground area and having a bent part of which at least a portion is positioned above the non-ground area, the pair of monopole antennas configured to be asymmetric about the feeding unit.

2. The antenna module of claim 1, wherein the power feeding units are formed at both ends of one short side of the rectangular ground area while facing each other.

3. The antenna module of claim 2, wherein one of the pair of monopole antennas is disposed along a long side of the ground area, and a remaining monopole antenna is disposed along a short side of the ground area.

4. The antenna module of claim 3, further comprising a global navigation satellite system (GNSS) antenna or a Wi-Fi antenna disposed along a long side of the ground area in adjacent to the monopole antenna disposed along the long side of the ground area.

5. The antenna module of claim 1, wherein the monopole antennas include multi input and multi output (MIMO) antennas.

6. The antenna module of claim 1, wherein the monopole antennas are formed in an inverted triangular shape and bent outward at a predetermined height.

7. The antenna module of claim 6, further comprising a carrier formed of an insulating material, which is provided on the ground area to support a plurality of monopole antennas.

8. The antenna module of claim 1, wherein the bent part of the monopole antenna which is formed by bending the monopole antenna at a right angle.

9. The antenna module of claim 6, wherein a horizontal length of the bent monopole antenna is longer than a vertical length of the bent monopole antenna.

10. A vehicle comprising an antenna module according to claim 1.

* * * * *